US008775052B2

(12) United States Patent
Ghoneim et al.

(10) Patent No.: US 8,775,052 B2
(45) Date of Patent: Jul. 8, 2014

(54) SENSORS BIAS DETECTION FOR ELECTRONIC RETURNLESS FUEL SYSTEM

(75) Inventors: Youssef A. Ghoneim, Rochester, MI (US); Mark N. Howell, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 237 days.

(21) Appl. No.: 13/326,385

(22) Filed: Dec. 15, 2011

(65) Prior Publication Data

US 2013/0158833 A1 Jun. 20, 2013

(51) Int. Cl.
*G06F 19/00* (2011.01)

(52) U.S. Cl.
USPC ............................ 701/102; 318/567; 702/182

(58) Field of Classification Search
USPC .......... 180/171, 175–177, 338, 421; 318/567, 318/599, 560, 645, 650; 123/497; 417/45; 701/102
See application file for complete search history.

(56) References Cited

U.S. PATENT DOCUMENTS

| | | | | |
|---|---|---|---|---|
| 4,032,757 | A * | 6/1977 | Eccles | 700/81 |
| 4,215,412 | A * | 7/1980 | Bernier et al. | 701/100 |
| 5,048,479 | A * | 9/1991 | Bartke | 123/198 D |
| 5,120,201 | A * | 6/1992 | Tuckey et al. | 417/366 |
| 6,578,416 | B1 * | 6/2003 | Vogel et al. | 73/304 C |
| 7,117,120 | B2 * | 10/2006 | Beck et al. | 702/182 |
| 7,431,020 | B2 * | 10/2008 | Ramamurthy | 123/497 |
| 2005/0274362 | A1 * | 12/2005 | DeRaad | 123/497 |
| 2009/0086396 | A1 * | 4/2009 | Bax et al. | 361/93.6 |
| 2009/0235994 | A1 * | 9/2009 | Lubinski et al. | 137/535 |
| 2010/0199681 | A1 * | 8/2010 | Dooley | 60/776 |

OTHER PUBLICATIONS

U.S. Appl. No. 13/069,457, Ghoneim.

* cited by examiner

*Primary Examiner* — Stephen K Cronin
*Assistant Examiner* — Joshua Campbell

(57) ABSTRACT

A method for isolating an actual sensor bias in a fuel delivery system having a fuel pump includes monitoring first, second and third fuel pump parameters, detecting first and second fuel pump sensor biases based on the monitored first, second and third fuel pump parameters, modeling a fourth fuel pump modeled parameter based on the monitored second and third fuel pump parameters, and isolating the actual sensor bias in one of the detected first and second fuel pump biases based on the monitored third fuel pump parameter and the modeled fourth fuel pump modeled parameter.

19 Claims, 4 Drawing Sheets

SENSORS BIAS DETECTION FOR ELECTRONIC RETURNLESS FUEL SYSTEM

TECHNICAL FIELD

This disclosure is related to fuel delivery systems in a vehicle.

BACKGROUND

The statements in this section merely provide background information related to the present disclosure. Accordingly, such statements are not intended to constitute an admission of prior art.

The supply of fuel to an internal combustion engine in a consistent and reliable manner is essential to proper vehicle operation. A typical vehicle fuel system includes a fuel pump which is submerged in a fuel tank. A fuel filter and a pressure regulator may be positioned on the respective intake and outlet sides of the fuel pump. Filtered fuel is thus delivered to a fuel rail, where it is ultimately injected into the engine cylinders. An Electronic Returnless Fuel System (ERFS) includes a sealed fuel tank and lacks a dedicated fuel return line. These and other features of the ERFS help to minimize vehicle emissions.

Conventional diagnostic techniques for a vehicle fuel system typically rely on knowledge of a prior failure condition. For example, it is known when servicing the vehicle a maintenance technician may determine by direct testing and/or review of a recorded diagnostic code that the fuel pump requires repair or replacement. This reactive diagnosis may not occur until vehicle performance has already been compromised. A proactive approach may be more advantageous, particularly when used with emerging vehicle designs utilizing an ERFS.

SUMMARY

A method for isolating an actual sensor bias in a fuel delivery system having a fuel pump includes monitoring first, second and third fuel pump parameters, detecting first and second fuel pump sensor biases based on the monitored first, second and third fuel pump parameters, modeling a fourth fuel pump modeled parameter based on the monitored second and third fuel pump parameters, and isolating the actual sensor bias in one of the detected first and second fuel pump biases based on the monitored third fuel pump parameter and the modeled fourth fuel pump modeled parameter.

BRIEF DESCRIPTION OF THE DRAWINGS

One or more embodiments will now be described, by way of example, with reference to the accompanying drawings, in which.

DETAILED DESCRIPTION

Figure 1:
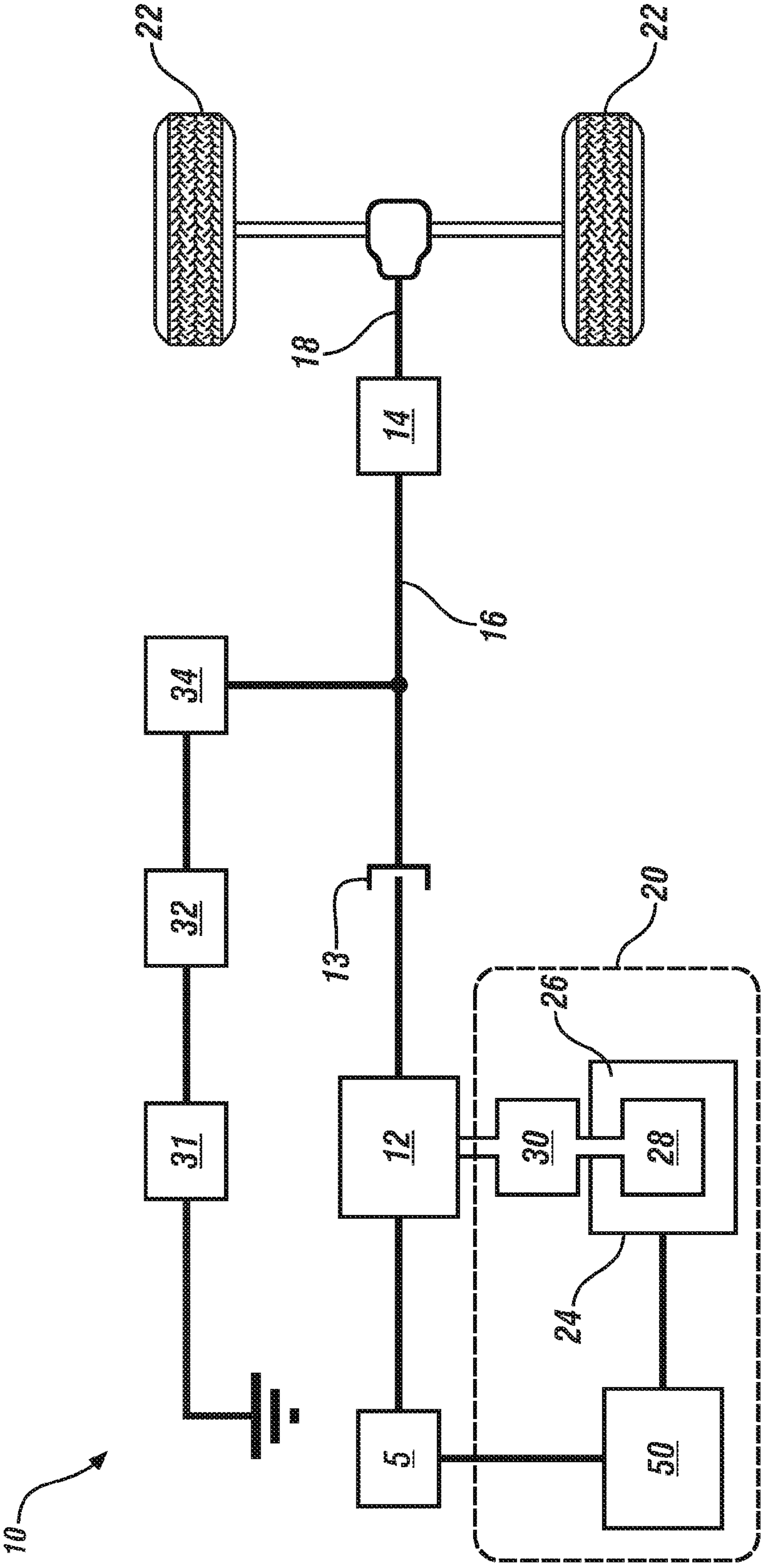
FIG. 1 schematically illustrates a vehicle including a fuel delivery system, in accordance with the present disclosure.

Referring now to the drawings, wherein the showings are for the purpose of illustrating certain exemplary embodiments only and not for the purpose of limiting the same, FIG. 1 schematically illustrates a vehicle 10 including a fuel delivery system 20. The fuel delivery system 20 can be an Electronic Returnless Fuel System (ERFS) that can include an ERFS controller 50. In an ERFS, a fuel tank 24 containing a supply of fuel 26 such as gasoline, ethanol, E85, or other combustible fuel is sealed relative to the surrounding environment and lacks a dedicated fuel return line. A fuel pump 28 such as a roller cell pump or gerotor pump is submerged in the fluid 26 within the fuel tank 24, and is operable for circulating fuel 26 to an internal combustion engine 12 in response to control and feedback signals from the ERFS controller 50. A fuel rail 30 is in fluid communication with fuel injectors of the internal combustion engine 12.

The vehicle 10 includes a transmission 14 having an input member 16 and an output member 18. The engine 12 may be selectively connected to the transmission 14 using an input clutch and damper assembly 13, e.g., when the vehicle 10 is a hybrid electric vehicle (HEV). The vehicle 10 may also include a DC energy storage system 31, e.g., a rechargeable battery module, which may be electrically connected to one or more high-voltage electric traction motors 34 via a traction power inverter module (TPIM) 32. A motor shaft from the electric traction motor 34 selectively drives the input member 16 when motor torque is needed. Output torque from the transmission 14 is ultimately transferred via the output member 18 to set drive wheels 22 to propel the vehicle 10.

Figure 2:
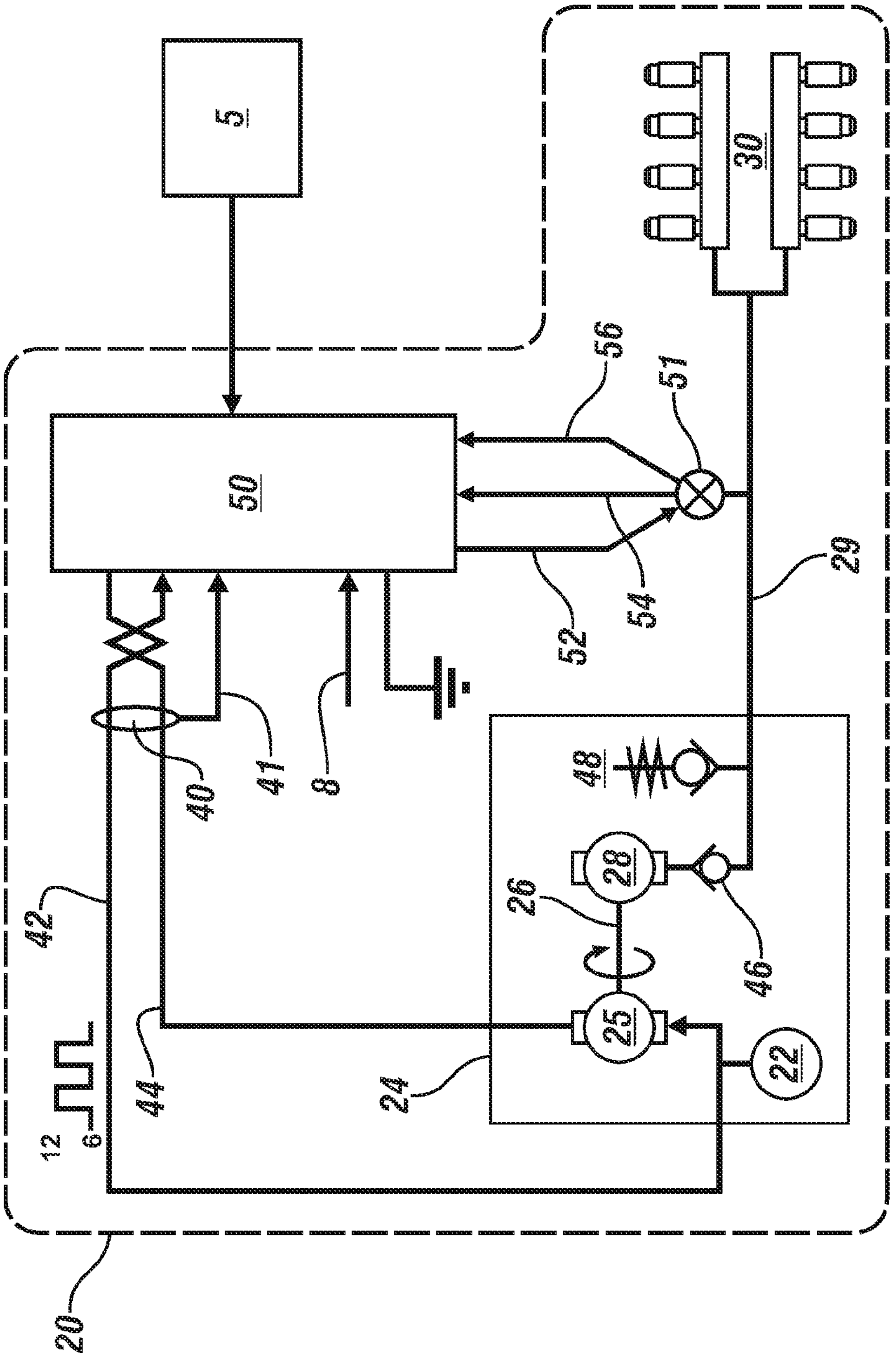
FIG. 2 schematically illustrates an electronic returnless fuel system (ERFS), in accordance with the present disclosure.

Referring to FIG. 2, the ERFS 20 is schematically illustrated in accordance with the present disclosure. The ERFS controller 50, in communication with an engine control module (ECM) 5, controls the fuel pump 28 to achieve and/or maintain a desired fuel system pressure commanded by the ECM 5 under all operating conditions. For instance, a fuel pump enable input representing the desired fuel system pressure can be input to the ERFS controller 50 from the ECM 5. Fuel system pressure can be measured by a pressure sensor 51 along a fuel line 29 providing the pressurized fuel from the fuel pump 28 to the fuel rail 30. The fuel system pressure can be referred to herein as a pump pressure 54 monitored by the ERFS controller 50 as a feedback input. The ERFS system 20 includes the ERFS controller 50, the fuel tank 24 and the fuel rail 30 for providing pressurized fuel to injectors of the engine 12. As aforementioned, the fuel pump 28 is disposed within the fuel tank 24. A pump motor 25 disposed within the fuel tank 24 provides power via a rotating pump shaft 26 mechanically coupled to the fuel pump 28, thereby providing the desired fuel system pressure along the fuel line 29 to the fuel rail 30, wherein the pump pressure 54 is monitored by the ERFS controller 50.

In an exemplary embodiment of the present disclosure and still referring to FIG. 2, the fuel pump 28 can be controlled via pulse width modulation (PWM) 42 in response to the fuel pump enable input input to the ERFS controller 50 from the ECM 5. The PWM 42 delivers pulsed energy to the pump motor 25, via a rectangular pulse wave. The pulse width of this wave is automatically modulated by the ERFS controller 50 resulting in a particular variation of an average value of the pulse waveform. The pulsed energy can be provided by a battery (e.g., DC energy storage system 31 of FIG. 1) and managed by the ERFS controller 50 based on a battery input 8 to the ERFS controller 50 representing the pulsed energy to be provided. By automatically modulating or adjusting the PWM 42 using the ERFS controller 50, energy flow can be precisely regulated to the pump motor 25 for controlling the fuel pump 28 to achieve the desired fuel system pressure, and likewise fuel supply to the engine 12. In response to the fuel pump pressure 54 as a function of the PWM 42 input to the pump motor 25, a pump current is measured by a current sensor 22 within the ERFS controller 50. Further, the pump current measured by the current sensor 22 is monitored by the ERFS controller 50 and subsequently utilized for feedback control. The fuel tank 24 further includes a check valve 46 and a pressure vent valve (PVV) 48 disposed therein along the fuel line 29. The fuel pump 28 can be grounded via ground input 44 from the motor 25 to a grounding shield 40, whereby a ground shield input 41 is input to the ERFS controller 50.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

The ERFS controller 50 controls the fuel pump 28 to achieve and/or maintain the desired fuel system pressure by applying closed-loop correction derived from the monitored pump pressure 54 measured by the pressure sensor 51 and the monitored pump current measured by the current sensor 22 as feedback. Further, a pump voltage 56 in response to the PWM 42 is provided as feedback to—and monitored by—the ERFS controller 50. The current sensor 22 measures the pump current and is based on the fuel pump pressure 54 feedback as a function of the pump voltage 56. A reference voltage 52 is provided by the ERFS controller 50 to the pressure sensor 51.

It will be understood that the pump pressure 54, the pump current, and the pump voltage 56 can each be referred to as a fuel pump parameter. For instance, and in an exemplary embodiment of the present disclosure, the pump current, the fuel pump pressure 54 and the pump voltage 56 can be referred to as first, second and third fuel pump parameters, respectively.

Due to the closed-loop correction of the ERFS 20, an actual sensor error or bias in one of the pressure sensor 51 and the current sensor 22 may result in a fictitious error or bias detected in the other one of the pressure sensor 51 and the current sensor 22. The fictitious sensor error or bias is understood to represent a sensor reading indicating a fictitious or false sensor reading influenced as a result of the actual sensor error or bias. An actual or fictitious bias detected in the pressure sensor 51 can each be referred to as a detected pressure sensor bias. Similarly, an actual or fictitious bias in the current sensor 22 can each be referred to as a detected current sensor bias. Discussed in greater detail below, the detected pressure sensor bias is determined by modeling the pressure sensor (e.g., modeled second fuel pump parameter module 310) based on monitored pump current as measured by the current sensor 22. Likewise, the detected current sensor bias is determined by modeling the current sensor (e.g., modeled first fuel pump parameter module 308) based on the monitored pump pressure 54 as measured by the pressure sensor 51. A sensor bias controller 300 discussed below in FIG. 3 can be utilized to isolate the actual sensor bias in one of the detected biases in the current sensor 22 and the pressure sensor 51, and further, isolate the fictitious sensor bias in the other one of the detected biases in the current sensor 22 and the pressure sensor 51 based on a determined change in angular pump speed, Δω. Accordingly, the isolated actual sensor bias in one of the detected biases in the current sensor 22 and the pressure sensor 51 can be flagged. Whereas, the isolated fictitious sensor bias in the other one of the detected biases in the current sensor 22 and the pressure sensor 51 can be reset as a non-detected fuel pump sensor bias within the controller 300. In other words, the fictitious sensor bias in the other one of the detected biases in the current sensor 33 and the pressure sensor 51 can be removed from being a detected fuel pump sensor bias.

Figure 3:
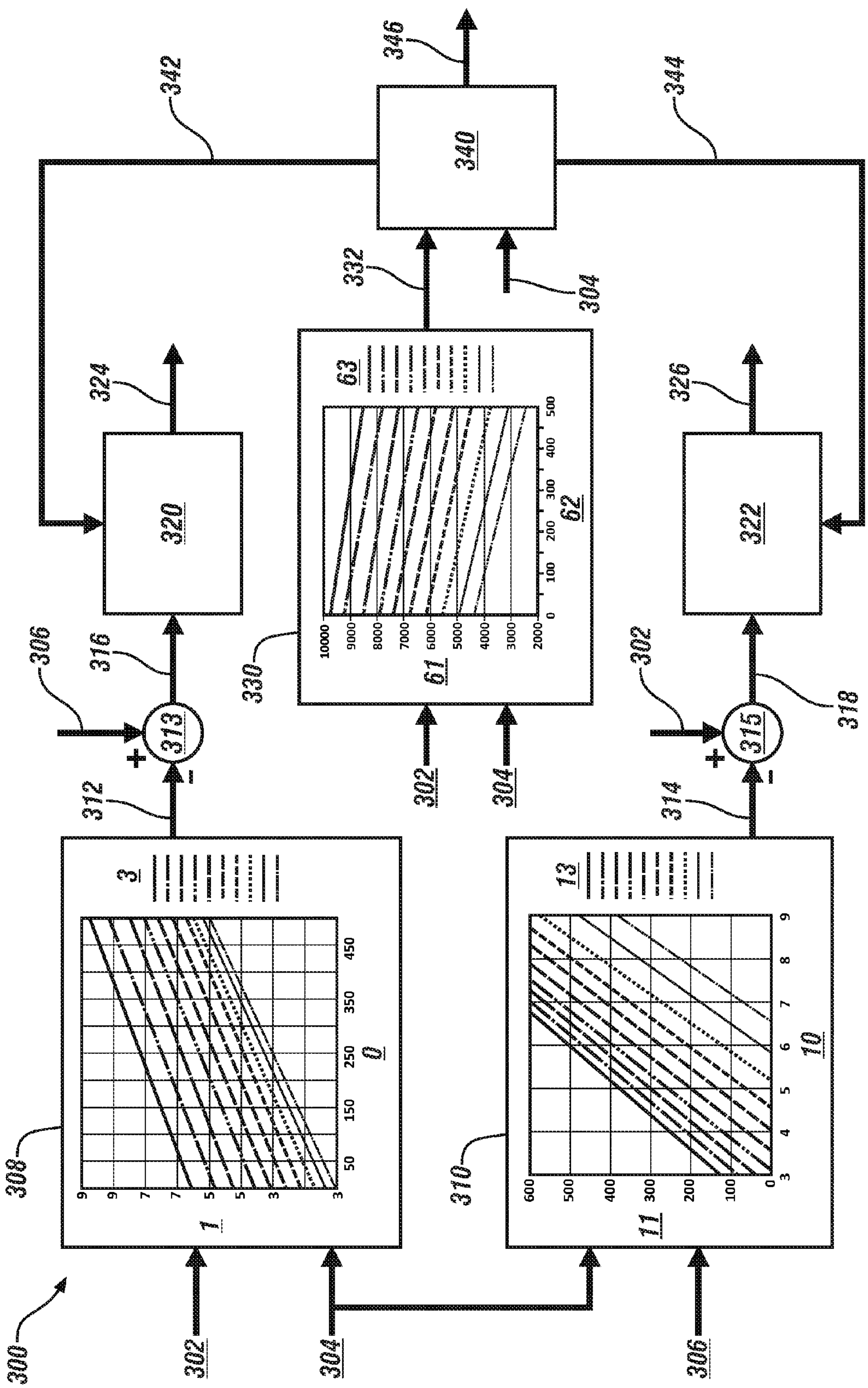
FIG. 3 schematically illustrates a sensor bias controller including a bias isolation module for isolating an actual sensor bias in one of detected first and second fuel pump sensor biases, in accordance with the present disclosure.

FIG. 3 schematically illustrates the sensor bias controller 300 including a bias isolation module 340 for isolating an actual sensor bias in one of detected first and second fuel pump sensor biases 324,326, respectively, in accordance with the present disclosure. As will become apparent, each of the detected first and second fuel pump sensor biases 324,326, respectively, are based on monitoring first, second and third fuel pump parameters 306, 302, 304, respectively. The sensor bias controller 300 includes modeled first and second fuel pump parameter modules 308,310, respectively, first and second difference units 313, 315, respectively, first and second filter modules 320,322, respectively, a modeled fourth fuel pump parameter module 330 and the bias isolation module 340.

The modeled first fuel pump parameter module 308 models a first fuel pump modeled parameter 312 based on the monitored second and third fuel pump parameters 302, 304, respectively. The modeled first fuel pump parameter module 308 includes a relationship between the modeled first fuel pump modeled parameter 312 and the monitored second fuel pump parameter 302 as a function of the third fuel pump parameter 304. In an exemplary embodiment, the modeled first fuel pump modeled parameter 312 corresponds to a modeled pump current, the monitored second fuel pump parameter 302 corresponds to the pump pressure 54 and the monitored third fuel pump parameter 304 corresponds to the pump voltage 56. In the exemplary embodiment, the relationship between the modeled pump current and the pump pressure as a function of pump voltage may be expressed as follows:

$$I_m = a_i P_s + b_i \qquad [1]$$

wherein

- $I_m$ is the modeled current,
- $P_s$ is the fuel pump pressure 54 measured by the pressure sensor 51 illustrated in FIG. 2,
- $a_i$ is a first voltage dependent based on the monitored pump voltage 56 with respect to pump current, and
- $b_i$ is a second voltage dependent based on the monitored pump voltage 56 with respect to pump current.

The relationship between the modeled current and the pump pressure as a function of pump voltage may be graphically illustrated using Equation [1] where a first vertical axis 1 denotes current (AMPS), a second vertical axis 3 denotes voltage (V) and the horizontal axis 0 denotes pressure (KPA), where the $I_m$ (e.g., modeled first fuel pump modeled parameter 312) is output by the modeled first fuel pump parameter module 308 and input to the first difference unit 313.

In an exemplary embodiment of the present disclosure, the modeled first fuel pump modeled parameter 312 is input to the first difference unit 313 and compared with the monitored first fuel pump parameter 306 to determine a first fuel pump parameter difference 316. In a non-limiting example, the modeled first fuel pump modeled parameter 312 corresponds to $I_m$, the monitored first fuel pump parameter 306 corresponds to the pump current measured by the current sensor 22 and the first fuel pump parameter difference 316 corresponds to a current difference, $I_d$.

The first fuel pump parameter difference 316 may be input to the first filter module 320 where the first fuel pump parameter difference 316 may be filtered. In an exemplary embodiment of the present disclosure the first filter module 320 includes a Kalman filter. The first filter module 320 can detect the first fuel pump sensor bias 324 when the first fuel pump parameter difference 316 exceeds a first detected bias threshold.

The modeled second fuel pump parameter module 310 models a second fuel pump modeled parameter 314 based on the monitored first and third fuel pump parameters 306, 304, respectively. The modeled second fuel pump parameter module 310 includes a relationship between the modeled second fuel pump modeled parameter 314 and the monitored first fuel pump parameter 306 as a function of the third fuel pump parameter 304. In an exemplary embodiment, the modeled second fuel pump modeled parameter 314 corresponds to a modeled pump pressure, the monitored first fuel pump parameter 306 corresponds to the pump current and the monitored third fuel pump parameter 304 corresponds to the pump voltage. In the exemplary embodiment, the relationship between the modeled pump pressure and the pump current as a function of pump voltage may be expressed as follows:

$$P_m = \frac{I_s - b_i}{a_i} \qquad [2]$$

wherein $P_m$ is the modeled pump pressure, and $I_s$ is the pump current measured by the current sensor 22 illustrated in FIG. 2.

The relationship between the modeled pump pressure and the pump current as a function of pump voltage may be graphically illustrated using Equation [2] where a first vertical axis 11 denotes pressure (KPA), a second vertical axis 13 denotes voltage (V) and the horizontal axis 10 denotes current (AMPS), where the $P_m$ (e.g., modeled second fuel pump modeled parameter 314) is output by the second modeled fuel pump parameter module 310 and input to the second difference unit 315.

In an exemplary embodiment of the present disclosure, the modeled second fuel pump modeled parameter 314 is input to the second difference unit 315 and compared with the monitored second fuel pump parameter 302 to determine a second fuel pump parameter difference 318. In a non-limiting example, the modeled second fuel pump modeled parameter 314 corresponds to $P_m$, the monitored second fuel pump parameter 302 corresponds to the pump pressure 54 and the second fuel pump parameter difference 318 corresponds to a pressure difference, $P_d$.

The second fuel pump parameter difference 318 may be input to the second filter module 322 where the second fuel pump parameter difference 318 may be filtered. In an exemplary embodiment of the present disclosure the second filter module 322 includes a Kalman filter. The second filter module 322 can detect the second fuel pump sensor bias 326 when the second fuel pump parameter difference 318 deviates from a second detected bias threshold.

Still referring to FIG. 3, the modeled fourth fuel pump parameter model module 330 models a fourth fuel pump modeled parameter 332 based on the monitored second and third fuel pump parameters 302,304, respectively. In an exemplary embodiment of the present disclosure, the modeled fourth fuel pump parameter module 330 includes a relationship between the modeled fourth fuel pump modeled parameter 332 and the monitored second fuel pump parameter 302 as a function of the third fuel pump parameter 304. In an exemplary embodiment, the modeled fourth fuel pump modeled parameter 332 corresponds to a modeled angular pump speed, the monitored second fuel pump parameter 302 corresponds to the pump pressure and the monitored third fuel pump parameter 304 corresponds to the pump voltage. In the exemplary embodiment, the relationship between the modeled angular pump speed and the pump pressure as a function of the pump voltage may be expressed as follows:

$$\omega_m = a_\omega P_s + b_\omega \qquad [3]$$

wherein $\omega_m$ is the modeled angular pump speed, $P_s$ is the fuel pump pressure 54 measured by the pressure sensor 51 illustrated in FIG. 2, $a_\omega$ is the first voltage dependent based on the monitored pump voltage 56 with respect to angular pump speed, and $b_\omega$ is the second voltage dependent based on the monitored pump voltage 56 with respect to angular pump speed.

The relationship between the modeled angular pump speed and the pump pressure as a function of pump voltage may be graphically illustrated using Equation [3] where a first vertical axis 61 denotes pump speed (rad/sec), a second vertical axis 63 denotes voltage (V) and the horizontal axis 62 denotes pressure (KPA), where the $\omega_m$ (e.g., modeled fourth fuel pump parameter 332) is output by the modeled fourth fuel pump parameter module 330 and input to the bias isolation module 340.

In an exemplary embodiment of the present disclosure, the bias isolation module 340 isolates an actual sensor bias 346 in one of the detected first and second fuel pump parameter biases 324,326, respectively based on the third fuel pump parameter 304 and the modeled fourth fuel pump modeled parameter 332. Further, a first or second fictitious sensor bias 342 or 344, respectively, can be isolated in the other one of the detected first and second fuel pump parameter biases 324, 326, respectively, based on the third fuel pump parameter 304 and the modeled fourth fuel pump modeled parameter 332. In a non-limiting example, the bias isolation module 340 can isolate an actual current sensor bias (e.g., actual sensor bias 346) in the detected current sensor bias (e.g., first fuel pump sensor bias 324) and a fictitious pressure sensor bias (e.g., second fictitious sensor bias 344) in the detected pressure sensor bias (e.g., second fuel pump sensor bias 326) based on the modeled angular pump speed (e.g., modeled fourth fuel pump modeled parameter 332) and the pump voltage (e.g. third fuel pump parameter 304). In another non-limiting example, the bias isolation module 340 can isolate an actual pump sensor bias (e.g., actual sensor bias 346) in the detected pump sensor bias (e.g., second fuel pump sensor bias 326) and a fictitious current sensor bias (e.g., first fictitious sensor bias 342) based on the modeled pump speed (e.g., modeled fourth fuel pump modeled parameter 332) and the pump voltage (e.g. third fuel pump parameter 304).

The bias isolation module 340 utilizes a number of relationships in order to determine the actual sensor bias 346 and one of the first and second fictitious sensor biases 342,344, respectively. Specifically, the relationships are based on unbiased fuel pump parameters in the case that there are no detected fuel pump sensor biases. Unbiased fuel pump parameters provide the ERFS controller 50 with a validated expected baseline level of pump performance, and may include armature resistance, a counter or back electromotive force, and motor inductance. Hence, modeled fuel pump modeled parameters will be equal to corresponding sensor measurements when there are no detected fuel pump sensor biases (e.g., detected first and second fuel pump parameter sensor biases 324,326, respectively) (e.g., detected biases in the current sensor 22 and the pressure sensor 51). A first relationship between an unbiased pump voltage, an unbiased pump current and an unbiased angular pump speed may be expressed as follows:

$$V=IR_a+K_e\omega_{unbiased} \qquad [4]$$

wherein

- V is the pump voltage 56 in response to the PWM 42 provided as feedback to—and monitored by—the ERFS controller 50,
- I is an unbiased pump current,
- $R_a$ is an armature resistance,
- $K_e$ is equal to an electromotive force constant of the pump motor 25, and
- $\omega_{unbiased}$ is an unbiased angular pump speed.

A second relationship between pump current and the unbiased angular pump speed is established from Equations [1] and [3], and may be expressed as follows.

$$I = \frac{a_i[\omega_{unbiased} - b_\omega]}{a_\omega} + b_i \qquad [5]$$

A third relationship between the unbiased pump speed and the pump voltage is established by substituting Equation [5] into Equation [4], and may be expressed as follows.

$$\omega_{unbiased} = \frac{1}{K_e + \frac{R_a a_i}{a_\omega}}\left[V + R_a\left(\frac{a_i}{a_\omega}b_\omega - b_i\right)\right] \qquad [6]$$

It will be appreciated that Equation [5] based on the combination of Equations [1] and [3] allows for an interpolation of the pump current based on unbiased angular pump speed and voltage. Further, Equation [6] based on substituting Equation [5] into Equation [4] yields a determination for the unbiased angular pump speed based on pump voltage where the pump pressure and the pump current have been removed in the determination of the unbiased angular pump speed, $\omega_{unbiased}$.

In an exemplary embodiment of the present disclosure, determining a changed angular pump speed, Δω, can be utilized by the bias isolation module 340 to isolate the actual sensor bias 340 in one of the detected first and second fuel pump sensor biases 324,336, respectively. A relationship between the unbiased angular pump speed and the modeled angular pump speed may be expressed as follows:

$$\Delta\omega=|\omega_{unbiased}-\omega_m| \qquad [7]$$

wherein

- Δω is the changed pump speed, $\omega_{unbiased}$ is the unbiased pump speed that can be determined in Equation [6], and
- $\omega_m$ is the modeled pump speed 332 that can be determined using Equation [3].

As aforementioned, the bias isolation module 340 can isolate the actual sensor bias 346 in one of the detected first and second fuel pump sensor biases 324,336, respectively, based on the monitored third fuel pump parameter 304 (e.g., pump voltage 56) and the modeled fourth fuel pump modeled parameter 332 (e.g., $\omega_m$). Isolating the actual sensor bias 346 includes determining an unbiased fourth fuel pump parameter based on the monitored third fuel pump parameter. In an exemplary embodiment, the unbiased fourth fuel pump parameter is the unbiased angular pump speed, $\omega_{unbiased}$, determined utilizing Equation [6] and the monitored third fuel pump parameter is the pump voltage 56. The modeled fourth fuel pump modeled parameter (e.g., $\omega_m$) is compared with the determined unbiased fourth fuel pump parameter (e.g., $\omega_{unbiased}$). A changed parameter can be determined based on a difference between the modeled fourth fuel pump modeled parameter and the unbiased fourth fuel pump parameter. In the exemplary embodiment, the comparison utilizes Equation [7] to determine a change in pump speed, Δω, corresponding to the changed parameter where isolating the actual sensor bias 346 in one of the detected first and second fuel pump sensor biases 324, 326, respectively, is based on the comparing. Hence, the actual sensor bias 346 is based on the value of the Δω determination and described in further detail below. Further, one of the first and second fictitious sensor biases 342,344, respectively, can be isolated in the other one of the detected first and second fuel pump sensor biases 324,336, respectively, based on the value of the Δω. In other words, the actual sensor bias 346 can be isolated in one of the detected biases in the current sensor and the pressure sensor and the fictitious sensor bias 342 or 344 can be isolated in the other one of the detected biases in the current sensor and the pressure sensor based on the determined change in angular pump speed, Δω.

In an exemplary embodiment of the present disclosure, the isolated actual sensor bias 346 is based on the change in angular pump speed, Δω, determined utilizing Equation [7]. In a first scenario, a relationship between the Δω (e.g., changed parameter) and an actual sensor bias threshold is expressed as follows:

$$\Delta\omega\leq\epsilon_1 \qquad [8]$$

wherein $\epsilon_1$ is the actual sensor bias threshold.

In a second scenario, a relationship between the Δω (e.g., changed parameter), the actual sensor bias threshold and a detected pressure sensor bias as a function of pump voltage is expressed as follows:

$$\Delta\omega\geq|-a_\omega P_{bias}|+\epsilon_1 \qquad [9]$$

wherein

- $P_{bias}$ is the detected second fuel pump sensor bias 326 in the pressure sensor 51.

Referring to Equation [8], when the determined changed parameter is not greater than the actual sensor bias threshold, $\epsilon_1$, the actual sensor bias 346 can be isolated in the detected first fuel pump sensor bias 324. Similarly, the second fictitious sensor bias 344 can be isolated and input to the second filter module 322 where the fictitious sensor bias can be reset in the detected second fuel pump sensor bias 326. In an exemplary embodiment, when the Δω is not greater than the $\epsilon_1$, the actual sensor bias 346 can be isolated in the detected bias in the current sensor 22 and the fictitious sensor bias can be isolated in the detected bias in the pressure sensor 51. Hence, the isolated actual sensor bias 346 in the detected bias in the current sensor 22 can be flagged by the ERFS controller 20 and the fictitious sensor bias 344 can be input to the second filter module 322 where the fictitious sensor bias can remove the detected bias in the pressure sensor 51.

Referring to Equation [9], when the determined changed parameter is at least the actual sensor bias threshold, $\epsilon_1$, plus the absolute value of the detected second fuel pump sensor bias as a function of the third fuel pump parameter, $|-a_\omega P_{bias}|$, the actual sensor bias 346 can be isolated in the detected second fuel pump sensor bias 326. Similarly, the first fictitious sensor bias 342 can be isolated and input to the first filter module 320 where the fictitious sensor bias can be reset in the detected first fuel pump sensor bias 324. In an exemplary embodiment, when the $\Delta\omega$ is at least the $|-a_\omega P_{bias}|+\epsilon_1$, the actual sensor bias 346 can be isolated in the detected bias in the pressure sensor 51 and the fictitious sensor bias 342 can be isolated in the detected bias in the current sensor 22. Hence, the isolated actual sensor bias 346 in the detected bias in the pressure sensor 51 can be flagged by the ERFS controller 20 and the fictitious sensor bias 342 can be input to the first filter module 320 where the fictitious sensor bias can remove the detected bias in the current sensor 22.

Figure 4:
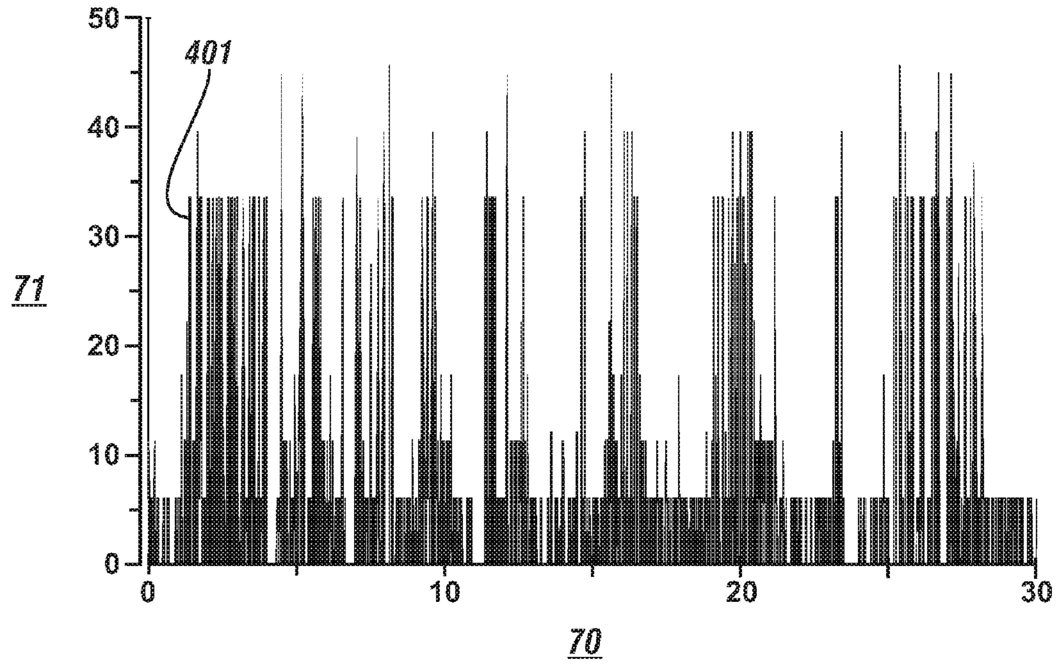
FIGS. 4 and 5 graphically depict experimental and derived data from the exemplary fuel delivery system depicting a change in angular pump speed versus time, in accordance with the present disclosure.

FIG. 4 graphically depicts experimental and derived data from an exemplary fuel delivery system having a fuel pump, depicting a change in pump speed, $\Delta\omega$, in accordance with the present disclosure. The horizontal axis 70 denotes time in seconds and the vertical axis 71 denotes change in pump speed, $\Delta\omega$, in radians per second. Profile line 401 denotes the $\Delta\omega$. In a non-limiting example, the $\Delta\omega$ is not greater than or equal to the actual sensor bias, $\epsilon_1$, described above utilizing Equation [8]. For instance, the $\epsilon_1$ can be 50 radians per second. Hence, and in the non-limiting example, the $\Delta\omega$ as illustrated by the profile line 401, depicts an actual sensor bias in a current sensor, and therefore, a fictitious sensor bias in a pressure sensor.

Figure 5:
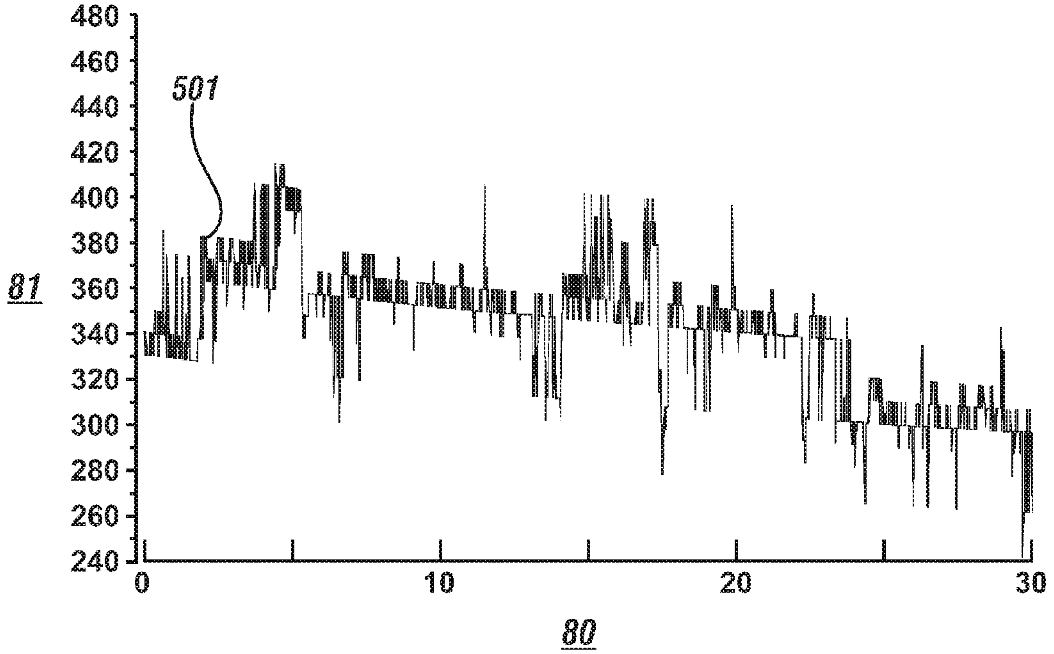

FIG. 5 graphically depicts experimental and derived data from an exemplary fuel delivery system having a fuel pump, depicting a change in pump speed, $\Delta\omega$, in accordance with the present disclosure. The horizontal axis 80 denotes time in seconds and the vertical axis 81 denotes change in pump speed, $\Delta\omega$, in radians per second. Profile line 501 denotes the $\Delta\omega$. In a non-limiting example, the $\Delta\omega$ is at least the actual bias sensor threshold, $\epsilon_1$, plus an absolute value of the detected second fuel pump sensor bias (e.g., pressure sensor bias, $P_{bias}$) as a function of the third fuel pump parameter (e.g., pump voltage), described above utilizing Equation [9]. For instance, $|-a_\omega P_{bias}|+\epsilon_1$ can be 240 radians per second. Hence, and in the non-limiting example, the $\Delta\omega$ as illustrated by the profile line 501, depicts an actual sensor bias in a pump sensor, and therefore, a fictitious sensor bias in a current sensor.

The disclosure has disclosed certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for isolating an actual sensor bias in a fuel delivery system having a fuel pump comprising:

monitoring a plurality of fuel pump parameters, comprising:

monitoring a first fuel pump parameter comprising a pump current measured by a current sensor, monitoring a second fuel pump parameter comprising a pump pressure measured by a pressure sensor, and monitoring a third fuel pump parameter comprising a pump voltage;

modeling a first fuel pump modeled parameter based on the monitored second fuel pump parameter and the monitored third fuel pump parameter, said modeled first fuel pump modeled parameter corresponding to a modeled pump current;

modeling a second fuel pump modeled parameter based on the monitored first fuel pump parameter and the monitored third fuel pump parameter, said modeled second fuel pump modeled parameter corresponding to a modeled pump pressure;

detecting first and second fuel pump sensor biases, comprising detecting the first fuel pump sensor bias based on a comparison between the first fuel pump parameter to the modeled first fuel pump modeled parameter, said detected first fuel pump sensor bias comprises a current sensor bias, and detecting the second fuel pump sensor bias based on a comparison between the modeled second fuel pump modeled parameter to the second fuel pump parameter, said detected second fuel pump sensor bias comprises a pressure sensor bias;

modeling a fourth fuel pump modeled parameter based on the monitored second and third fuel pump parameters; and isolating the actual sensor bias in one of the detected first and second fuel pump biases based on the monitored third fuel pump parameter and the modeled fourth fuel pump modeled parameter.

2. The method of claim 1 wherein the modeled fourth fuel pump modeled parameter comprises a modeled angular pump speed.

3. The method of claim 1 wherein the pump voltage is monitored in response to a pulse width modulation voltage to the fuel pump.

4. The method of claim 1 wherein detecting first and second fuel pump sensor biases comprises:

determining a first fuel pump parameter difference based on the comparison between the modeled first fuel pump modeled parameter to the monitored first fuel pump parameter;

determining a second fuel pump parameter difference based on the comparison between the modeled second fuel pump modeled parameter to the monitored second fuel pump parameter;

detecting the first fuel pump sensor bias when the first fuel pump parameter difference deviates from a first detected bias threshold; and detecting the second fuel pump sensor bias when the second fuel pump parameter difference deviates from a second detected bias threshold.

5. The method of claim 4 further comprising:

filtering the first and second fuel pump differences.

6. The method of claim 1 wherein isolating the actual sensor bias in one of the detected first and second fuel pump sensor biases comprises isolating a fictitious sensor bias in the other one of the detected first and second fuel pump sensor biases based on the monitored third fuel pump parameter and the modeled fourth fuel pump modeled parameter.

7. The method of claim 6 further comprising:

flagging the isolated actual sensor bias in one of the detected first and second fuel pump sensor biases; and resetting the fictitious sensor bias as a non-detected fuel pump sensor bias in the other one of the detected first and second fuel pump sensor biases.

8. The method of claim 1 wherein isolating the actual sensor bias in one of the detected first and second fuel pump sensor biases comprises:

determining an unbiased fourth fuel pump parameter based on the monitored third fuel pump parameter;

comparing the modeled fourth fuel pump modeled parameter and the unbiased fourth fuel pump parameter; and isolating the actual sensor bias in one of the detected first and second fuel pump sensor biases based on the comparing.

9. The method of claim 8 wherein the unbiased fourth fuel pump parameter comprises an unbiased angular pump speed.

10. The method of claim 8 wherein isolating the actual sensor bias in one of the detected first and second fuel pump sensor biases comprises:

determining a difference between the modeled fourth fuel pump modeled parameter and the unbiased fourth fuel pump parameter; and isolating the actual sensor bias in the detected first fuel pump sensor bias when the determined difference is not greater than an actual sensor bias threshold.

11. The method of claim 8 wherein isolating the actual sensor bias in one of the detected first and second fuel pump sensor biases comprises:

determining a difference between the modeled fourth fuel pump modeled parameter and the unbiased fourth fuel pump parameter;

isolating the actual sensor bias in the detected second fuel pump sensor bias when the determined difference is at least the actual sensor bias threshold plus an absolute value of the detected second fuel pump sensor bias as a function of the third fuel pump parameter.

12. The method of claim 1 wherein the fuel delivery system is an electronic returnless fuel system.

13. The method of claim 12 wherein the electronic returnless fuel system maintains a desired fuel system pressure by applying closed-loop correction derived from the monitored first and second fuel pump parameters as feedback.

14. Method for isolating an actual sensor bias in an electronic returnless fuel delivery system having a fuel pump including a pressure sensor and a current sensor comprising:

monitoring a pump pressure, a pump current and a pump voltage;

modeling pump current based on the monitored pump pressure and the monitored pump voltage;

modeling pump pressure based on the monitored pump current and the monitored pump voltage;

detecting biases in the current sensor and the pressure sensor, comprising:

detecting the bias in the current sensor based on a comparison between the monitored pump current to the modeled pump current, wherein the detected bias in the current sensor does not differentiate between an actual sensor bias in the current sensor and a fictitious sensor bias in the current sensor resulting from an actual sensor bias in the pressure sensor, and detecting the bias in the pressure sensor based on a comparison between the monitored pump pressure to the modeled pump pressure, wherein the detected bias in the current sensor does not differentiate between the actual sensor bias in the pressure sensor and a fictitious bias in the pressure sensor resulting from the actual sensor bias in the current sensor;

modeling an angular pump speed based on the monitored pump pressure and the monitored pump voltage;

determining an unbiased angular pump speed based on the monitored pump voltage, comparing the modeled angular pump speed and the unbiased angular pump speed;

determining a change in angular pump speed based on a difference between the modeled angular pump speed and the unbiased angular pump speed; and isolating the corresponding actual sensor bias in one of the detected biases in the current sensor and the pressure sensor and isolating the corresponding fictitious sensor bias in the other one of the detected biases in the current sensor and the pressure sensor based on the determined change in the angular pump speed.

15. The method of claim 14 wherein isolating the corresponding actual sensor bias in one of the detected biases in the current sensor and the pressure sensor and isolating the corresponding fictitious sensor bias in the other one of the detected biases in the current sensor and the pressure sensor based on the determined change in angular pump speed, comprises:

isolating the corresponding actual sensor bias in the detected bias in the current sensor and isolating the corresponding fictitious sensor bias in the detected bias in the fuel pump pressure sensor when the determined change in angular pump speed is less than an actual bias sensor threshold.

16. The method of claim 14 wherein isolating the corresponding actual sensor bias in one of the detected biases in the current sensor and the pressure sensor and isolating the corresponding fictitious sensor bias in the other one of the detected biases in the current sensor and the pressure sensor, comprises:

isolating the corresponding actual sensor bias in the detected bias in the pressure sensor and isolating the corresponding fictitious sensor bias in the detected bias in the current sensor when the determined change in angular pump speed is at least an actual bias sensor threshold plus an absolute value of the detected bias in the fuel pump pressure sensor as a function of the pump voltage.

17. The method of claim 14 wherein the electronic returnless fuel delivery system maintains a desired fuel system pressure by applying closed-loop correction derived from the monitored pump pressure measured by the pressure sensor and the monitored pump current measured by the current sensor as feedback.

18. The method of claim 14 wherein isolating the corresponding actual sensor bias in one of the detected biases in current sensor and the pressure sensor and isolating the corresponding fictitious sensor bias in the other one of the detected biases in the current sensor and the pressure sensor comprises:

flagging the corresponding isolated actual sensor bias in one of the detected biases in the current sensor and the pressure sensor; and removing the corresponding fictitious sensor bias from a detected bias in the other one of the detected biases in the current sensor and the pressure sensor.

19. An apparatus for isolating an actual sensor bias in an electronic returnless fuel delivery system including a first sensor and a second sensor comprising:

an internal combustion engine; and an electronic returnless fuel delivery system comprising:

a fuel tank;

a fuel pump positioned within the fuel tank and supplying fuel from the fuel tank to the engine; and a controller in communication with the fuel pump monitoring a plurality of fuel pump parameters, comprising:

monitoring a first fuel pump parameter comprising a pump current measured by a current sensor, monitoring a second fuel pump parameter comprising a pump pressure measured by a pressure sensor, and monitoring a third fuel pump parameter comprising a pump voltage, modeling a first fuel pump modeled parameter based on the monitored second fuel pump parameter and the monitored third fuel pump parameter, said modeled first fuel pump modeled parameter corresponding to a modeled pump current, modeling a second fuel pump modeled parameter based on the monitored second fuel pump parameter and the monitored third fuel pump parameter, said modeled second fuel pump modeled parameter corresponding to a modeled pump current, detecting first and second fuel pump sensor biases, comprising:

detecting the first fuel pump sensor bias based on a comparison between the first fuel pump parameter to the modeled first fuel pump modeled parameter, said detected first fuel pump sensor bias comprises a current sensor bias, and detecting the second fuel pump sensor bias based on a comparison between the modeled second fuel pump modeled parameter to the second fuel pump parameter, said detected second fuel pump sensor bias comprises a pressure sensor bias, modeling a fourth fuel pump modeled parameter based on the monitored second and third fuel pump parameters, and isolating the actual sensor bias in one of the detected first and second fuel pump biases based on the monitored third fuel pump parameter and the modeled fourth fuel pump modeled parameter.

* * * * *